(12) United States Patent
Paul et al.

(10) Patent No.: US 12,553,971 B2
(45) Date of Patent: Feb. 17, 2026

(54) METHOD FOR OPTIMIZING A PROTOCOL FOR OPERATING A MAGNETIC RESONANCE DEVICE

(71) Applicant: Siemens Healthineers AG, Forchheim (DE)

(72) Inventors: Dominik Paul, Bubenreuth (DE); Mario Zeller, Erlangen (DE); Flavio Carinci, Würzburg (DE)

(73) Assignee: Siemens Healthineers AG, Forchheim (DE)

( * ) Notice: Subject to any disclaimer, the term of this patent is extended or adjusted under 35 U.S.C. 154(b) by 180 days.

(21) Appl. No.: 18/374,036

(22) Filed: Sep. 28, 2023

(65) Prior Publication Data
US 2024/0111010 A1 Apr. 4, 2024

(30) Foreign Application Priority Data
Sep. 30, 2022 (DE) .................... 10 2022 210 385.8

(51) Int. Cl.
*G01R 33/54* (2006.01)
(52) U.S. Cl.
CPC ................ *G01R 33/543* (2013.01)
(58) Field of Classification Search
CPC ............ G01R 33/543; G01R 33/3854
See application file for complete search history.

(56) References Cited

U.S. PATENT DOCUMENTS

| | | |
|---|---|---|
| 9,945,919 B2 | 4/2018 | Zuehlsdorff et al. |
| 2013/0271139 A1 | 10/2013 | Grodzki et al. |
| 2014/0232396 A1 | 8/2014 | Grodzki et al. |
| 2015/0008919 A1 | 1/2015 | Grodzki et al. |
| 2015/0108981 A1 | 4/2015 | Grodzki et al. |
| 2015/0160317 A1 | 6/2015 | Grodzki |
| 2015/0204959 A1 | 7/2015 | Grodzki |
| 2021/0018578 A1* | 1/2021 | Wang ................. G01R 33/5673 |

(Continued)

FOREIGN PATENT DOCUMENTS

| | | |
|---|---|---|
| DE | 102013202559 B3 | 8/2014 |
| DE | 102012205864 B4 | 2/2015 |
| DE | 102013225415 B4 | 10/2015 |

(Continued)

*Primary Examiner* — G.M. A Hyder
(74) *Attorney, Agent, or Firm* — Banner & Witcoff, Ltd.

(57) ABSTRACT

Techniques for optimizing protocol parameters of an MR protocol are provided. The techniques provides for a combined safety/operability test gradient-specific gradient factors $F_x$ already determined prior to the performance of a test on an MR protocol and noise optimization of the MR protocol by means of a noise optimization method are used, with adjusted protocol parameters determined after the determination of the gradient-specific gradient factors $F_x$ via a test performed on the MR protocol, in the creation of an adjusted MR protocol. As a result, valuable computing time for the combined testing and optimization is saved, since multiplication of the parameter space of both the methods can be omitted. A method for the combined testing and noise optimization is herewith greatly accelerated by the use of pre-prepared gradient information, e.g. in the form of gradient factors.

17 Claims, 2 Drawing Sheets

(56) References Cited

U.S. PATENT DOCUMENTS

2024/0103110 A1   3/2024  Carinci et al.

FOREIGN PATENT DOCUMENTS

| | | |
|---|---|---|
| DE | 102013221062 B4 | 11/2015 |
| DE | 102014201236 B4 | 11/2015 |
| DE | 102013213255 B4 | 6/2017 |
| DE | 102022209976 A1 | 3/2024 |

\* cited by examiner

METHOD FOR OPTIMIZING A PROTOCOL FOR OPERATING A MAGNETIC RESONANCE DEVICE

CROSS-REFERENCE TO RELATED APPLICATIONS

The present application claims priority to and the benefit of Germany patent application no. DE 10 2022 210 385.8, filed on Sep. 30, 2022, the contents of which are incorporated herein by reference in their entirety.

TECHNICAL FIELD

The present application relates to a method for optimizing a protocol for operating a magnetic resonance device.

BACKGROUND

Magnetic resonance (MR) technology is a known technology with which images of the interior of an object under examination can be generated. In simple terms, the object under examination is positioned in a magnetic resonance device in a comparatively strong static, homogeneous constant magnetic field, also called a B0 field, with field strengths of between 0.2 Tesla and 7 Tesla and more, so that its nuclear spins align themselves along the constant magnetic field. To trigger nuclear spin resonances measurable as signals, radio-frequency (RF) excitation pulses are irradiated into the object under examination, the triggered nuclear spin resonances are measured as what is known as k-space data, and on the basis thereof, MR images are reconstructed or spectroscopy data is determined. For position encoding of the measured data, rapidly-switched magnetic gradient fields, called gradients for short, are superimposed on the constant magnetic field. One model used, which describes an operational sequence over time of RF pulses to be irradiated and gradients to be switched, is referred to as a pulse sequence (model), or also as a sequence for short. The plotted measured data is digitized and stored as complex numerical values in a k-space matrix. An associated MR image can be reconstructed from the k-space matrix populated with values, for example by means of a multidimensional Fourier transform.

SUMMARY

Depending on the operating mode of a magnetic resonance device used, different switching sequences and magnetic field strengths for the gradients to be switched are defined, which can be generated and varied by means of a corresponding gradient unit. These switching sequences are (inter alia) specified in an MR protocol which also includes the pulse sequence to be used, which on a time-coordinated basis likewise specifies the activation of a radio-frequency unit of the magnetic resonance device for the emission of RF pulses to deflect the magnetic dipoles in the area under examination from the basic orientation, and thus triggers nuclear spin resonances.

MR protocols comprise a plurality of protocol parameters which define the acquisition of measured data to be performed with the MR protocol. Protocol parameters comprise parameters which define a contrast to be generated, a desired resolution, a desired field of view (FOV), and when appropriate a desired acceleration of the acquisition. Protocol parameters can thus for example comprise parameters such as echo times TE, repeat times TR, flip angles, a resolution, a number of slices to be acquired, the respective slice thicknesses, pause times, contrast preparations, as well as corresponding acceleration factors in the case of accelerated acquisition procedures, such as for example by a parallel acquisition of measured data, for example by means of GRAPPA or SENSE, or other accelerated procedures in which the k-space is not scanned in full in accordance with Nyquist.

The gradient unit for generating the gradients is typically a rapidly-switched electrically-operated coil system with multiple gradient coils, which in a defined manner generate magnetic fields, for example in a spatial direction x, y, and z orthogonal to one another, with the help of currents, which are in the order of a few 100 amperes.

Because of interaction forces (Lorentz forces) of these currents with the constant magnetic field of the magnetic resonance device, and the interaction of magnetic stray fields of the gradient unit (eddy current forces) with conductive regions of the magnetic resonance device, strong mechanical oscillations of the gradient unit occur, which result not only in a high load on the magnetic resonance device from a mechanical perspective, but also in a very noticeable generation of noise.

For example, from the publications DE 10 2012 205 864 B4; DE 10 2013 213 255 B4; DE 10 2013 225 415 B4; DE 10 2013 221 062 B4; DE 10 2014 201 236 B4; DE 10 2013 225 415 B4; and U.S. Pat. No. 9,945,919 B2, optimization methods are known which for a particular examination purpose optimize desired MR protocols, in particular gradients to be switched in the included pulse sequences, such that a significant reduction in the aforementioned generation of noise is achieved. As described extensively in the aforementioned publications, an optimization such as this is based on several conditions that ensure that the actual acquisition of measured data is not affected by the optimization of the MR protocol. As a result of the optimization, for example, factors $F_x$ for the slew rates of the respective gradients x are output, which maximally reduce the slew rates (where $F_x$ for example is between 1% and 100%).

An optimization such as this, also referred to below as noise optimization, generally takes place gradually, wherein multiple, for example 60 to 100 or more steps, also called preparation steps, may be necessary, until the desired optimization of the gradients to be switched in the MR protocol is achieved.

For the operation of a radio-frequency unit of a magnetic resonance device, the magnetic resonance device normally comprises one or more radio-frequency amplifiers, which amplify a signal describing the transmitter pulse. The signal amplified by the radio-frequency amplifier is transmitted to one or more antennas of the radio-frequency unit, so that this can emit the desired transmitter pulse. Typically, a radio-frequency amplifier such as this is designed to store a particular quantity of electrical charge, e.g. in one or more capacitors, and when required, e.g. on output of a transmitter pulse by the radio-frequency unit, to retrieve this swiftly. The radio-frequency amplifier is however limited, in particular in respect of its output power, i.e. when an MR sequence is used the available output power represents a basic condition to be complied with, which is dependent on the magnetic resonance device, in particular on the nature of the hardware of the magnetic resonance device.

By absorption of the transmitter pulses in the body of an object under examination to be examined (for example of a patient) energy, in particular thermal energy, is introduced into the body of the object under examination. The specific absorption rate (SAR) must not exceed specified limit values so as to not jeopardize the safety of the object under examination. Thus, the specific absorption rate when an MR protocol is used represents a basic condition to be complied with, which is dependent on the object under examination.

Further basic conditions are additionally conceivable, which must be complied with when an MR protocol is used for the acquisition of measured data of an object under examination by means of a magnetic resonance device.

Known methods, which ensure that such basic conditions specific to the object under examination and/or to the hardware are being complied with, often require long test times, which can last several seconds depending on the MR protocol, magnetic resonance device, and/or object under examination. In this case, different variants of an originally-selected MR protocol are tested until the variant has been found that complies with the basic conditions and, in this case, further results in an acquisition of the originally-desired measured data.

The long test times represent a nuisance during the operation of a magnetic resonance device, but are necessary to ensure the operability of the MR protocol on the magnetic resonance device and/or the safety of the object under examination.

The subsequently published DE 10 2022 209 976 A1, for example, describes an accelerated method for testing MR protocols.

If, in addition to a described test on an MR protocol, an optimization of the MR protocol to reduce the formation of noise is to take place, the time needed for the test and optimization increases such that test times of up to a minute or more may result.

This is due to the requisite multiplication of the parameter space by the number of preparation steps required for the optimization. If, for example, 20 variants of an MR protocol for the test thereon are required and 75 preparation steps for the optimization, a total of 20*75=1500 calculations for the combined testing and optimization must be performed.

Long test times such as these, in particular in daily clinical practice, are frequently not acceptable, so for reasons of time efficiency the advantages of noise optimization methods are sometimes dispensed with.

The object of the disclosure is to enable a combined testing and noise optimization of MR protocols with acceptable test times.

The disclosure is based on the finding that not all adjustments of protocol parameters required by a test on an MR protocol have an effect on the gradient-specific gradient factors $F_x$ determined as results of noise optimization methods. If, thanks to the test on the MR protocol, for example, protocol parameters such as for example flip angles used or pause times are adjusted, this has no effect on the determined gradient-specific gradient factors $F_x$ and it is not necessary to determine these afresh by a renewed performance of the noise optimization. Other protocol parameters, such as for example a number of slices to be acquired or repeat times TR, do have an effect on the gradient-specific gradient factors $F_x$ determined by means of a noise optimization method. However, this effect may e.g. in the case of only minor changes to the protocol parameters by the adjustment of these protocol parameters determined by testing the MR protocol, be so small that differences in gradient-specific gradient factors $F_x$ determined in optimization procedures performed afresh with the adjusted protocol parameters from gradient-specific gradient factors $F_x$ determined prior to the adjustment can be ignored.

The object is achieved by a method for the optimization of protocol parameters of an MR protocol for the acquisition of desired measured data by means of a magnetic resonance device, a computer program, and an electronically-readable data storage medium as described in accordance with the embodiments described herein, including the claims.

A method for optimizing protocol parameters of an MR protocol for the acquisition of desired measured data by means of a magnetic resonance device in accordance with an embodiment comprises the following steps:

loading an MR protocol, with accompanying protocol parameters, which is to be optimized and has been determined for the acquisition of the desired measured data, performing an optimization on the basis of the loaded protocol parameters for the reduction of noise caused by an execution of the MR protocol on the magnetic resonance device, wherein as a result gradient-specific gradient factors for gradients to be switched in connection with the MR protocol are determined, storing the determined gradient-specific gradient factors of the MR protocol, performing a test on the MR protocol for compliance with at least one provided basic condition, wherein, if the test shows that at least one of the at least one basic conditions is not being complied with, adjusted protocol parameters are determined on the basis of the loaded protocol parameters, so that on application of the adjusted protocol parameters all provided basic conditions are complied with, creation of an adjusted MR protocol using the adjusted protocol parameters and using the stored gradient-specific gradient factors, sending the adjusted MR protocol to the magnetic resonance device for the execution of the adjusted MR protocol.

As a result of the use of gradient-specific gradient factors $F_x$ already determined prior to the performance of a test on an MR protocol by means of a noise optimization method, with adjusted protocol parameters determined after the determination of the gradient-specific gradient factors $F_x$ via a test performed on the MR protocol in the creation of an adjusted MR protocol, valuable computing time for the combined testing and optimization is saved, since a multiplication (described above) of the parameter space can be omitted. A method for the combined testing and noise optimization is herewith greatly accelerated by the use of pre-prepared gradient information (e.g. in the form of gradient factors).

A magnetic resonance device in accordance with an embodiment comprises a magnet unit, a gradient unit, a radio-frequency unit, and a control device configured to perform the method with a compensation gradient determination unit.

A computer program in accordance with an embodiment implements a method on a control device when executed on the control device. For example, the computer program comprises commands which, during the execution of the program by a control device, for example a control device of a magnetic resonance device, cause this control device to execute the method. The control device may be configured in the form of a computer.

The computer program can also be present here in the form of a computer program product that can be loaded directly into a memory of a control device, with program code means to execute the method if the computer program product is executed in an arithmetic unit of the computer system.

A computer-readable storage medium in accordance with an embodiment comprises commands which, upon execution by a control device, for example a control device of a magnetic resonance device, cause this to execute the method.

The computer-readable storage medium can be designed as a non-transitory electronically-readable data storage medium, which comprises electronically-readable control information stored thereon which comprises at least one computer program and is configured to perform the method when the data storage medium is used in a control device of a magnetic resonance device.

The advantages and explanations specified in respect of the method also apply analogously for the magnetic resonance device, the computer program product, and the electronically-readable data storage medium.

BRIEF DESCRIPTION OF THE DRAWINGS

Further advantages and details of the present disclosure emerge from the exemplary embodiments described below and on the basis of the drawings. The examples listed do not represent any restriction of the disclosure. In the drawings.

DETAILED DESCRIPTION OF THE DISCLOSURE

Figure 1:
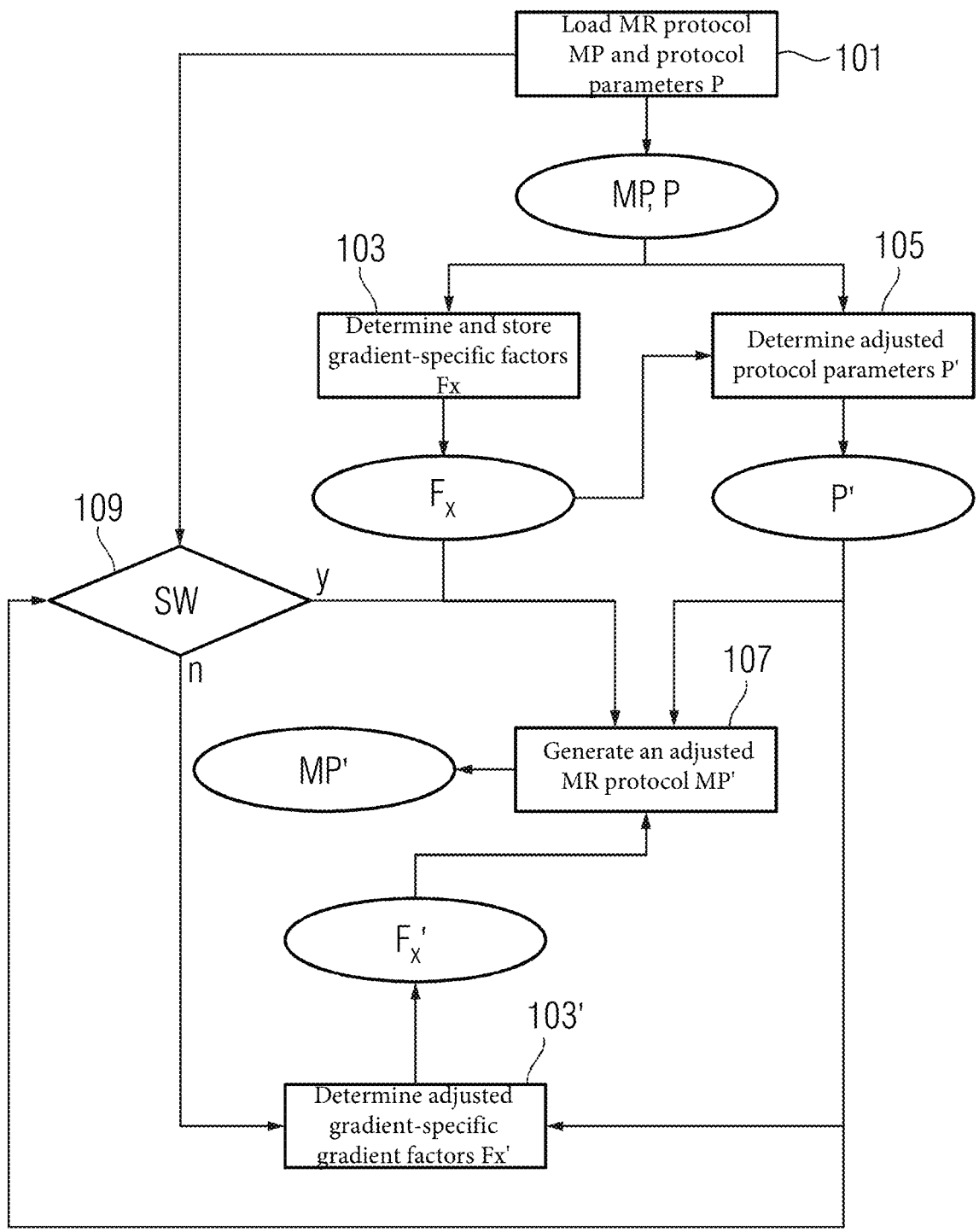
FIG. 1 illustrates an example flow diagram of a method, in accordance with one or more embodiments of the present disclosure.

FIG. 1 illustrates an example flow diagram of a method for optimizing protocol parameters of an MR protocol for the acquisition of desired measured data by means of a magnetic resonance device, in accordance with one or more embodiments of the present disclosure.

In this case, an MR protocol (MP), which is to be optimized and which is determined for the acquisition of the desired measured data, is loaded with accompanying protocol parameters P (Block 101). As described above, different MR protocols MP exist with associated protocol parameters P, which can be used for different examination purposes.

On the basis of the loaded protocol parameters P, an optimization for the reduction of noise caused by an execution of the MR protocol MP on the magnetic resonance device is performed, wherein as a result, gradient-specific gradient factors $F_x$ for gradients switched in connection with the MR protocol MP are determined and are stored for the MR protocol MP (Block 103). If, during an execution of the MR protocol MP, the determined gradient-specific gradient factors $F_x$ are applied to the respective gradients, this results in the desired noise reduction. A noise optimization method known may be employed here for this purpose.

A test on the MR protocol MP is performed for compliance with at least one provided basic condition, wherein, if the test shows that at least one of the at least one basic condition is not complied with, adjusted protocol parameters P' are determined on the basis of the loaded protocol parameters P (Block 105). The adjusted protocol parameters P' are hereby determined such that upon application of the adjusted protocol parameters P' during a performance of the MR protocol MP, all provided basic conditions are complied with. A method, for example as described above, which is known may be employed here for the test on operability and/or safety with the corresponding basic conditions.

Basic conditions for the test can comprise hardware-specific basic conditions (which are therefore dependent on the magnetic resonance device used) and/or basic conditions specific to the object under examination (which are therefore dependent on the object under examination from which measured data is to be acquired). For instance, a maximum specific absorption rate (SAR), a maximum available performance of a gradient unit of the magnetic resonance device, and/or of a radio-frequency unit of the magnetic resonance device may comprise basic conditions.

The gradient-specific gradient factors $F_x$ can here be determined and stored on a one-off basis, for example after creation of each MR protocol to be performed on a magnetic resonance device. Such gradient-specific gradient factors $F_x$ determined once already provide good noise reduction even with subsequently adjusted protocol parameters P', wherein the noise optimization does not significantly add to the time required for the combined testing and optimization for a creation of the adjusted MR protocol, since recourse is simply had to previously-stored values for the gradient-specific gradient factors $F_x$ of the MR protocol.

It is also conceivable to determine the gradient-specific gradient factors $F_x$ prior to a performance, e.g. each performance of the MR protocol on the magnetic resonance device. In this way, although the noise optimization does add to the time required for the combined testing and optimization for a creation of the adjusted MR protocol by one-time execution, the noise optimization does not, as with conventional techniques, add to the length of time needed for testing and adjusting the MR protocol, since this takes place independently of the noise optimization. Further, due to an optimization prior to a performance of the MR protocol MP on the magnetic resonance device, an update can be achieved where appropriate.

It is possible for threshold values SW to be defined for permitted deviations of loaded protocol parameters P from corresponding adjusted protocol parameters P'. This makes sense for instance for those protocol parameters P, P' that have an effect on results of a noise optimization in the form of gradient factors F. Here, for example, a maximum permitted deviation between a parameter comprised by the loaded protocol parameters P and the corresponding parameter comprised by the adjusted protocol parameters P' may be defined. For example, for a repeat time TR comprised by the protocol parameters, a maximum permitted deviation between the repeat time comprised by the loaded protocol parameters P and the repeat time comprised by the adjusted protocol parameters P' can be defined as a threshold value. It is further conceivable for a trigger condition, for example representing a maximum duration, to be defined as a threshold value, and if this is exceeded, for a renewed noise optimization to be performed. With such threshold values as triggers for a renewed noise optimization, it can be ensured that an up-to-date noise optimization is regularly performed.

A comparison can be performed, at least of the parameters provided with an associated threshold value, of the parameters comprised by the loaded protocol parameters P and the associated parameters comprised by the adjusted protocol parameters P', to establish whether the defined threshold values are being complied with (Query 109).

If the comparison of the loaded protocol parameters P with the adjusted protocol parameters P' shows that all threshold values are being complied with, the adjusted MR protocol is created using the previously determined adjusted protocol parameters P' and the stored gradient-specific gradient factors $F_x$ and is sent to the magnetic resonance device for the execution of the adjusted MR protocol MP' on the magnetic resonance device (Query 109, y).

If the comparison of the loaded protocol parameters P with the adjusted protocol parameters P' shows that at least one threshold value is not being complied with (Query 109, n), then on the basis of the adjusted protocol parameters P', a selective noise optimization for the reduction of noise caused by an execution of the adjusted MR protocol MP' on the magnetic resonance device is performed (Block 103'), wherein as a result of this optimization adjusted gradient-specific gradient factors $F_x'$ are selectively determined. In this case, the selective optimization can be restricted to those gradient-specific gradient factors $F_x$ that are affected by a threshold value being exceeded. The unaffected gradient-specific gradient factors $F_x$ can simply be taken over from the stored gradient-specific gradient factors F. The adjusted MR protocol MP is in this case created using the adjusted protocol parameters and using the adjusted gradient-specific gradient factors $F_x'$. The created adjusted MR protocol MP' is sent to the magnetic resonance device for execution of the adjusted MR protocol MP' on the magnetic resonance device.

In this way, it can be ensured that good noise optimization can be achieved even for adjusted protocol parameters P' that deviate by more than one defined threshold value from the corresponding loaded protocol parameters P, wherein the computing effort can be kept low.

The comparison of the loaded protocol parameters P with the adjusted protocol parameters P' can be performed prior to the creation of the adjusted MR protocol. In this way, an adjusted MR protocol need be created only once.

The optimization for the determination of the gradient-specific gradient factors $F_x$ can here be performed on an optimization unit of the magnetic resonance device arranged physically outside the magnetic resonance device, e.g. physically remote from a gradient unit of the magnetic resonance device. In this way, no resources of the magnetic resonance device are required for the optimization. The completed adjusted MR protocol MP' then merely needs to be sent again to the magnetic resonance device for execution.

Using the adjusted protocol parameters and using the stored gradient-specific gradient factors $F_x$ an adjusted MR protocol MP' is created (Block 107), which is sent to the magnetic resonance device for the execution of the adjusted MR protocol MP'.

With the method described here, which makes use of stored information about gradient factors $F_x$ for gradients comprised by an MR protocol that can be used for noise reduction, a considerable time saving can be made for a combined noise optimization and test for operability and/or safety of an MR protocol.

illustrates an example magnetic resonance device, in accordance with one or more embodiments of the present disclosure. The magnetic resonance device 1 comprises a magnet unit 3 (also referred to herein as a magnet or main magnet) configured to generate a constant magnetic field, a gradient unit 5 (also referred to herein as a gradient generator or gradient generation circuitry) configured to generate the gradient fields, a radio-frequency unit 7 (also referred to herein as RF circuitry or an RF transceiver) configured to irradiate (i.e. transmit) and receive RF signals, and a control device 9 (also referred to herein as a controller, a control computer, or control circuitry) configured to perform any of the embodiments as discussed herein.

Figure 2:
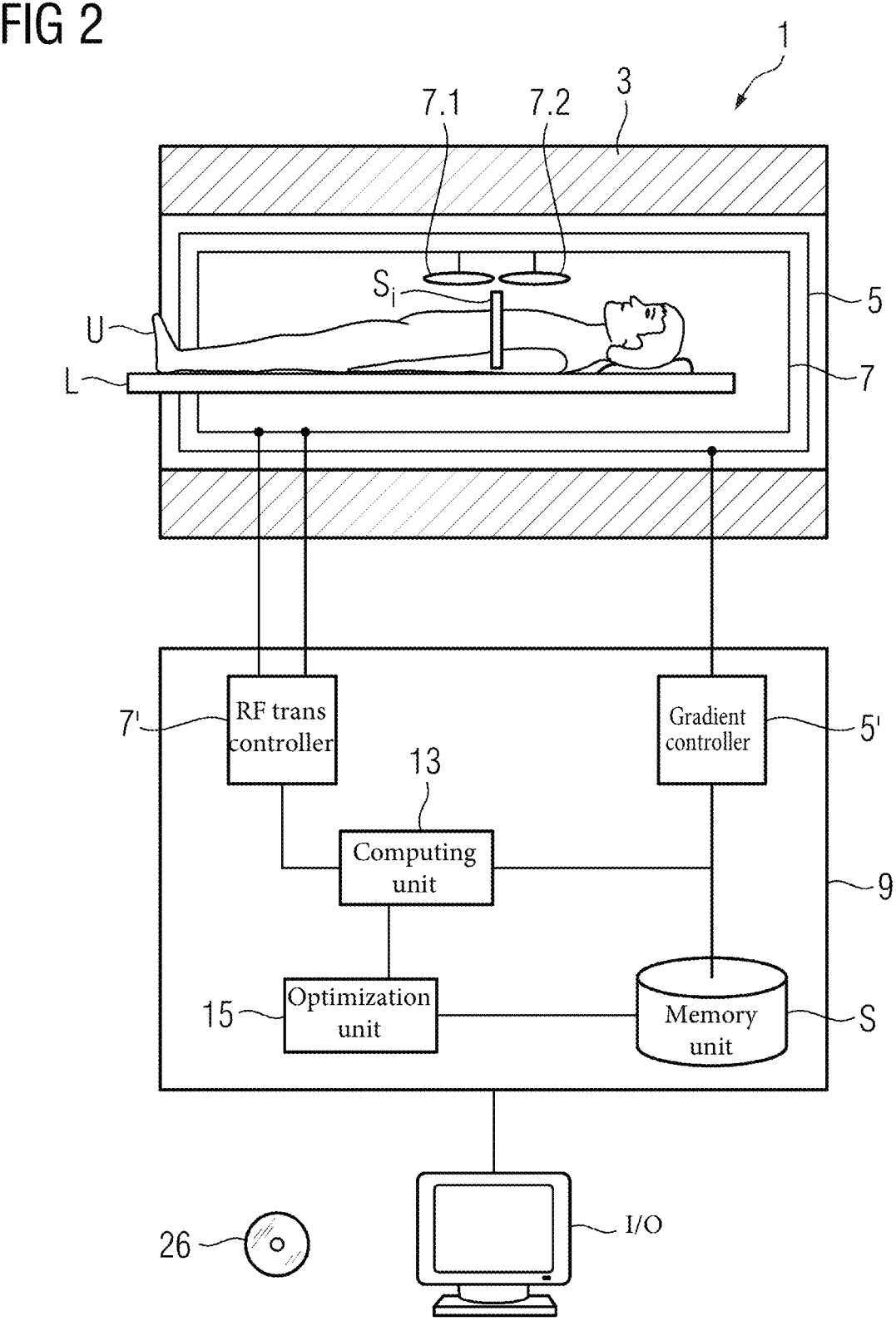
FIG. 2 illustrates an example magnetic resonance device, in accordance with one or more embodiments of the present disclosure.

FIG. 2 shows these modules of the magnetic resonance device 1 in a schematic representation. The radio-frequency unit 7 may consist of multiple subunits, for example of multiple coils such as the coils 7.1 and 7.2, or more coils that can be designed to transmit radio-frequency signals, to receive the triggered radio-frequency signals, or for both.

To examine an object under examination U, for example a patient or a phantom, the former may be introduced on a couch L into the measurement volume of the magnetic resonance device 1. The slice or the slab S, represents an exemplary target volume of the object under examination, from which echo signals are to be acquired and captured as measured data.

The control device 9 serves to control the magnetic resonance device 1 and can e.g. control the gradient unit 5 by means of a gradient controller 5' and the radio-frequency unit 7 by means of a radio-frequency transceiver controller 7' (also referred to herein as RF controller circuitry or an RF controller). The radio-frequency unit 7 can here comprise multiple channels on which signals can be sent or received.

The radio-frequency unit 7 is, together with its radio-frequency transceiver controller 7', responsible for generating and irradiating (transmitting) a radio-frequency alternating field for the manipulation of the spins in a region to be manipulated (for example in slices S to be measured) of the object under examination U. In this case, the center frequency of the radio-frequency alternating field, also called the B1 field, is generally wherever possible set so that it is close to the resonance frequency of the spins to be manipulated. Deviations of the center frequency from the resonance frequency are called off-resonance. To generate the B1 field, currents controlled by means of the radio-frequency transceiver controller 7' are applied to the RF coils in the radio-frequency unit 7.

The control device 9 can further comprise an optimization unit 15 (also referred to herein as an optimizer or optimization circuitry), with which MR protocols may advantageously be adjusted. The control device 9 is overall configured to perform any of the methods as discussed herein.

The optimization unit 15 comprises or has access to at least one computing unit and a memory. The optimization unit 15 may be integrated into a computing structure, for example the control device 9, where appropriate with various computing units, interfaces, and/or memories, or may access available computing units and/or memories. The optimization unit 15 may be integrated directly into the magnetic resonance device 1, e.g. in connection with an internal controller that serves to perform the final preparation and testing of measurements, acquisitions, and reconstructions to be performed with the magnetic resonance device 1. It is also conceivable for the optimization unit 15 to be arranged physically outside the magnetic resonance device 1, for example in a control room, from which the magnetic resonance device 1 may be operated. In this case too, adjusted MR protocols may be executed by the optimization unit 15 directly on the magnetic resonance device 1, e.g. without an (otherwise frequently customary) further test by an above-mentioned internal controller of the magnetic resonance device 1.

A computing unit 13 comprised by the control device 9 is designed to execute all computing operations required for the necessary measurements and determinations. Interim results and results required for this or determined here can be stored in a memory unit S (also referred to herein as storage, memory storage, or memory) of the control device 9. The units shown should here not necessarily be understood as physically separate units, but merely represent a breakdown into meaningful units, which however can also be implemented for example in fewer or even in just one single physical unit.

An input/output device E/A of the magnetic resonance device 1 can be used, for example by a user, to route control commands to the magnetic resonance device and/or to display results of the control device 9, such as image data for example.

A method described herein may also be present in the form of a computer program, which comprises commands that execute the described method on the control device 9 or other suitable components identified with the magnetic resonance device 1. Likewise, a computer-readable storage medium may be present that comprises commands that, during the execution by the control device 9 of the magnetic resonance device 1, cause the magnetic resonance device 1 to execute the described method.

The various components described herein may be referred to as "units," "modules," or "devices." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such units or devices, as applicable and relevant, may alternatively be referred to herein as "circuitry," "controllers," "processors," or "processing circuitry," or alternatively as noted herein.

What is claimed is:

1. A method for generating a magnetic resonance (MR) protocol for acquiring data via a MR device, comprising:
    loading an MR protocol that has been determined for acquiring the data, the MR protocol comprising protocol parameters;
    determining, based upon the loaded protocol parameters, gradient-specific gradient factors for gradients to be switched in connection with the MR protocol for a reduction of noise caused by execution of the MR protocol via the MR device;
    testing the MR protocol for compliance with one or more predetermined conditions;
    in response to a result of the testing indicating that compliance with at least one of the one or more predetermined conditions is not achieved, determining adjusted protocol parameters based upon the loaded protocol parameters such that, upon application of the adjusted protocol parameters, compliance with each one of the one or more predetermined conditions is achieved;
    generating an adjusted MR protocol using the adjusted protocol parameters and the gradient-specific gradient factors;
    transmitting the adjusted MR protocol to the MR device; and
    executing the adjusted MR protocol via the MR device.

2. The method as claimed in claim 1, further comprising:
    calculating threshold values for deviations of the loaded protocol parameters from corresponding ones of the adjusted protocol parameters;
    when a comparison of the loaded protocol parameters with the adjusted protocol parameters indicates a deviation in excess of at least one threshold value, performing, based upon the adjusted protocol parameters, an optimization for a reduction of noise caused by the execution of the adjusted MR protocol on the MR device;
    determining adjusted gradient-specific gradient factors based upon the optimization; and
    generating the adjusted MR protocol based upon the adjusted protocol parameters and the adjusted gradient-specific gradient factors.

3. The method as claimed in claim 2, wherein the comparison of the loaded protocol parameters with corresponding ones of the adjusted protocol parameters is performed prior to the generation of the adjusted MR protocol.

4. The method as claimed in claim 1, wherein the determination of the gradient-specific gradient factors is performed via optimization circuitry that is arranged physically outside the MR device and is remote from gradient generation circuitry of the MR device.

5. The method as claimed in claim 1, wherein the predetermined conditions comprise hardware-specific conditions.

6. The method as claimed in claim 1, wherein the predetermined conditions comprise conditions specific to an object under examination.

7. The method as claimed in claim 6, wherein the conditions specific to the object under examination comprise a maximum specific absorption rate (SAR).

8. The method as claimed in claim 1, wherein the predetermined conditions comprise a maximum available performance of gradient generation circuitry of the MR device.

9. The method as claimed in claim 1, wherein the predetermined conditions comprise a maximum available performance of RF circuitry of the MR device.

10. The method as claimed in claim 1, wherein the determining the gradient-specific gradient factors comprises determining the gradient-specific gradient factors after generating the MR protocol.

11. The method as claimed in claim 1, wherein the determining the gradient-specific gradient factors comprises determining the gradient-specific gradient factors prior to each execution of the MR protocol via the MR device.

12. The method as claimed in claim 1, wherein the gradient-specific gradient factors are determined and stored after loading the MR protocol that has been determined for acquiring the data, and
    wherein the stored gradient-specific gradient factors are reused with the adjusted protocol parameters for subsequent execution of the MR protocol without requiring a re-determination of the gradient-specific gradient factors for noise reduction.

13. The method as claimed in claim 1, wherein the determining of the gradient-specific gradient factors is performed prior to the testing of the MR protocol for compliance, and
    wherein the gradient-specific gradient factors are stored and subsequently combined with the adjusted protocol parameters determined after the testing.

14. The method as claimed in claim 13, wherein the gradient-specific gradient factors are stored and subsequently combined with the adjusted protocol parameters to thereby prevent a multiplication of parameter space calculations utilized for combined testing and noise optimization.

15. The method as claimed in claim 1, further comprising:
    calculating one or more threshold values for permitted deviations between the loaded protocol parameters and corresponding ones of the adjusted protocol parameters; and when at least one of the one or more threshold values is exceeded, selectively determining the gradient-specific gradient factors by restricting the adjustment to only those gradient-specific gradient factors that are affected by the respective ones of the one or more threshold values being exceeded.

16. A magnetic resonance (MR) device, comprising:
a main magnet,
a gradient generator;
a radio-frequency (RF) transceiver; and
a controller comprising an RF transceiver controller and an optimizer,
wherein the controller is configured to generate a MR protocol for acquiring data via the MR device by:
   loading an MR protocol that has been determined for acquiring the data, the MR protocol comprising protocol parameters;
   determining, based upon the loaded protocol parameters, gradient-specific gradient factors for gradients to be switched in connection with the MR protocol for a reduction of noise caused by execution of the MR protocol via the MR device;
   testing the MR protocol for compliance with one or more predetermined conditions;
   in response to a result of the testing indicating that compliance with at least one of the one or more predetermined conditions is not achieved, determining adjusted protocol parameters based upon the loaded protocol parameters such that, upon application of the adjusted protocol parameters, compliance with each one of the one or more predetermined conditions is achieved;
   generating an adjusted MR protocol using the adjusted protocol parameters and the gradient-specific gradient factors;
   transmitting the adjusted MR protocol to the MR device for execution.

17. A non-transitory computer-readable storage medium having instructions stored thereon that, when executed by a controller of a magnetic resonance (MR) device, cause the MR device to generate a MR protocol for acquiring data via the MR device by:
   loading an MR protocol that has been determined for acquiring the data, the MR protocol comprising protocol parameters;
   determining, based upon the loaded protocol parameters, gradient-specific gradient factors for gradients to be switched in connection with the MR protocol for a reduction of noise caused by execution of the MR protocol via the MR device;
   testing the MR protocol for compliance with one or more predetermined conditions;
   in response to a result of the testing indicating that compliance with at least one of the one or more predetermined conditions is not achieved, determining adjusted protocol parameters based upon the loaded protocol parameters such that, upon application of the adjusted protocol parameters, compliance with each one of the one or more predetermined conditions is achieved;
   generating an adjusted MR protocol using the adjusted protocol parameters and the gradient-specific gradient factors;
   transmitting the adjusted MR protocol to the MR device for execution.

* * * * *